Nov. 8, 1949  A. M. MARKS  2,487,063
POLYVINYL BUTYRAL SILICATE POLARIZER LAMINATION
Filed May 20, 1943

INVENTOR.
Alvin M. Marks
BY
*Pineles & Greene*
ATTORNEYS

Patented Nov. 8, 1949

2,487,063

UNITED STATES PATENT OFFICE 2,487,063

POLYVINYL BUTYRAL SILICATE POLARIZER LAMINATION

Alvin M. Marks, New York, N. Y.

Application May 20, 1943, Serial No. 487,691

2 Claims. (Cl. 88—65)

My invention relates to a lamination comprising a substantially continuous crystalline film laminated between two transparent supports, and more particularly my invention relates to a lamination comprising a polarizing element maintained in a plastic interlayer between two sheets of glass in which the lamination is so formed that the plasticizer is substantially homogeneously distributed through the interlayer.

The object of the present invention is to provide a polarizing lamination having a substantially constant composition so that light rays passing therethrough are substantially undeviated and a minimum of light scatter is caused.

Another object of the present invention is to provide a continuous crystalline polarizing lamination of substantially constant plasticizer content on both sides of a polarizing element contained in the interlayer.

It is a further object of the present invention to cause a plasticizer to be distributed in a polarizing interlayer so that by reason of the substantially uniform distribution a safe level of plasticizer concentration is effected throughout the lamination.

It is a further object of the present invention to laminate a polarizing element having a crystal lattice structure using a long chain high molecular weight plasticizer that properly coacts with the polarizing element.

In a preferred form of my invention, these objects are accomplished by applying a thin coating of polyvinyl butyral containing a small amount or no plasticizer to plastic or glass plates and laminating therebetween a silica treated polyvinyl butyral polarizer similar to that described in my copending application Serial No. 439,954 filed April 21, 1942, now Patent 2,432,113, issued Dec. 9, 1947, the adhesion being effected by an oxidized or blown castor oil application to the surface of the plastic layer on the glass and to the surfaces of the silica treated polyvinyl butyral polarizer.

I have found that the oxidized castor oil, being a long chain high molecular weight composition and in addition an excellent plasticizer for the polyvinyl butyral, will travel through the lattice structure of the polarizing element and distribute itself substantially homogeneously throughout the interlayer comprising the polyvinyl butyral coating of the glass and the polyvinyl butyral coating on the element. Further, the long chain high molecular weight blown castor oil appears to attach itself to and co-polymerize with the polyvinyl butyral—silica lattice.

Figure 1:
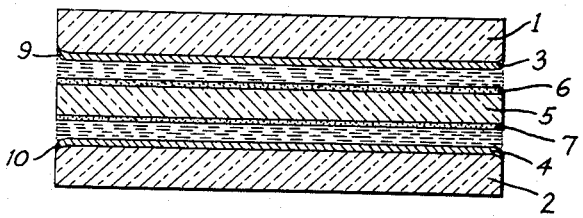
Figure 2:
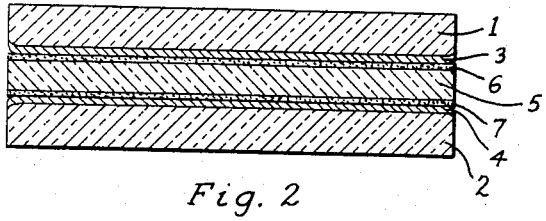
Figure 3:
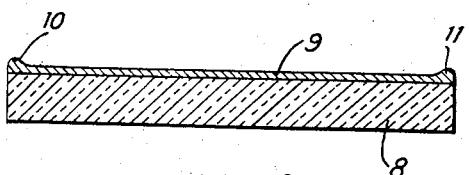

The invention can be more particularly described by reference to the attached drawings in which Figure 1 shows the component elements of the lamination ready for assembly and, Figure 2 shows the assembled elements ready for the lamination. Figure 3 is a side view of a glass plate with a coating of plastic material thereon.

In the drawings, glass plates 1 and 2 are coated with polyvinyl butyral coatings 3 and 4 as will be described more particularly hereinafter, the polyvinyl butyral coating being a high polymeric polyvinyl butyral, such as carbide and carbon XYSG grade polyvinyl butyral and containing from 0 to 15% by weight of suitable plasticizer such as dibutyl phthalate, or blown castor oil.

The central polarizing film which comprises polyvinyl butyral which has been stretched and treated with iodine to form a polarizer and then treated in a solution of ethyl silicate in ethylene dichloride according to the description in copending application Serial No. 439,954, filed April 21, 1942 acts as a polarizer in that the surface areas 6 and 7 thereof comprise substantially continuous crystalline coatings having the property of polarizing light.

Essentially the central polarizing film comprises a continuous crystalline lattice which is formed from substances having the property of polarizing light when in the crystalline state. Moreover, the crystal lattice has been strengthened by the formation of cross linkages within the crystal lattice, thus producing a continuous crystalline sheet which is dimensionally stable under extreme variations of temperature.

In a preferred form of my invention, the polarizing crystal structure comprises a surface layer on the central sheeting, the molecular unit of which consists of iodopolyvinyl butyral silicate which has been formed in accordance with copending application Serial No. 439,954, filed April 21, 1942.

Alternately in another form of my invention the central sheeting may comprise a continuous crystalline lattice having the property of polarization throughout and not merely in a surface layer.

This may for example occur when the film formed in accordance with my copending application is extremely thin in which case the surface layers on both faces of the film sheet would form a substantially uniform composition through the entire film.

Referring now to the application of the polyvinyl butyral to the glass supports 1 and 2, I have found that a polyvinyl butyral solution should contain suitable plasticizer and solvent such as a solution of 10–15% of polyvinyl butyral in a suitable solvent such as ethyl, propyl or butyl alcohol with approximately 10% plasticizer by weight of the polyvinyl butyral content.

The polyvinyl butyral solution is applied on to the glass plates 1 and 2 which may be of circular or rectangular shape by tilting the glass plate and pouring the solution inwardly from the edge towards the center of the tilted plate. This procedure of pouring avoids formation of air bubbles in the solution when it is poured. The glass plate, with the solution poured thereon, is then placed on a table mounted to rotate about its vertical axis. The plate is thus spun around its vertical axis, the plate being substantially in a horizontal plane. This spinning action causes the plastic solution to spread out over the plate and produce a film of substantially uniform thickness thereon, except only that at the extreme edges which are beveled the solution forms a thick bead. This thick bead, however, is submerged below the level of the plastic coated surface because of the bevel as shown in the drawing, Figure 1.

The rotation of the plate throws off by centrifugal force excess of solution and the turbulence of the air above the rotating plate rapidly dries out the solvent from the coating, thus producing an adherent film of substantially uniform thickness attached to the glass surface.

The procedure described herein may be used in preparing the plates for lamination in manufacturing the laminated article of the present invention. The method of forming the coating of constant thickness described herein, however, may be used in the formation of any coating of constant thickness upon a support whether it be flat, spherical or any other curvature. The thickness of the coating can be easily controlled by controlling the variables involved amongst which are the viscosity of the plastic solution, the revolutions per minute of the rotating table and the temperature of the solution, the plate and the surrounding air.

The coatings may be formed of various thicknesses and in making the lamination of the present invention, I prefer a coating ranging in thickness from .0003 to .0015 inch in thickness.

Most of the excess material is flung off by the centrifugal force and excess solution near the edge is prevented from affecting the flatness of the film by forming below its plane in the bevel, as shown in Figures 1 and 2.

In Figure 3 I show the effect when no beveled edge is employed. On an unbeveled glass 8 is spun a plastic coating 9 which in spreading and drying forms edge beads 10 and 11.

It is within the purview of my invention to apply the coating in other manners such as by application through a hopper or by doctor plate. The thickness may vary according to method of application.

In assembling the lamination, I apply blown or oxidized castor oil in a suitable quantity to extend completely over the faces of the plastic coated surface areas 3, 4, 6, and 7 and I then press the laminations together, exerting upon the lamination a pressure of about 1–10 pounds per square inch, thus causing the castor oil to spread completely over the surface areas. The excess oil flows out over the edge and leaves only a very thin contacting film. In addition I apply heat on the order of 57° C. from one to five hours. Additional heat in the form of infra red radiation may be employed to aid in the internal distribution of the plasticizer.

I have found that the oxidized castor oil does not act merely on the contiguous surfaces 3, 6, 4 and 7, but penetrates throughout the polarizing surface areas 6 and 7 into the polyvinyl butyral sheets 5 and also into the polyvinyl butyral coatings on the glass surfaces so that a substantially uniform distribution and homogeneity of the oxidized castor oil is effected throughout the lamination. This makes for greater stability because the concentration of plasticizer in contact with the polarizing crystalline layer is greatly diminished by its uniform distribution throughout the entire body of the lamination.

With reference to the plasticizers which I may employ, I prefer plasticizers comprising long chain compounds which because of their long chain structure are capable of lying in the direction of their long chain parallel to similar long chain units which comprise the units forming the lattice structure of the continuous crystalline film, such as plasticizers which belong to the family of compounds including the glyceryl ester of rincoleic acid.

The size of this type of plasticizer molecule immobilizes or renders it substantially incapable of freedom of motion once it enters the lattice structure. Thus, its solvent action on constituents within the lattice structure is reduced.

Of great importance is the fact that a substantially homogeneous optical unit is thus produced so that blurring due to light deviation or refraction effects are reduced to a minimum.

The adherence obtained by the lamination here set forth is unusually high and completely satisfactory. The lamination is singularly free from bubble formation and breakdown. Moreover the lamination is singularly impervious and insoluble in water, hence no edge sealing is required. Since the lamination is also extremely thin, the assembly of precision optical units, and/or their subsequent grinding and polishing may be effected without loss in accuracy.

Other plastic compositions having the action defined above may be employed in lieu of the polyvinyl butyral.

My invention is not limited to the specific constituents or component elements set forth herein, but comprises broadly a lamination which consists of a high polymeric continuous crystalline central film bonded to an outer protecting surface by means of an adhesive comprising the same or similar high polymeric structural units, the adhesion being effected by means of an inert plasticizer which is distributed in substantial homogeneity throughout the central continuous crystalline sheet and the adhesive medium bonding the central sheet to the protective surface.

I thereby provide an optically homogeneous lamination that is, a lamination which will cause a minimum of aberration or refractive deviation of rays of light passing therethrough. While there has been illustrated a useful form of the present invention comprising a continuous crystalline polarizing sheet lamination according to the procedures and principles set forth herein, it is within the purview of my invention to laminate other continuous crystalline mediums, as for example, a continuous crystalline polyvinyl butyral sheet which may act for example as a quarter wave plate.

Various modifications of my invention will suggest themselves to those skilled in the art.

I accordingly desire that in construing the breadth of the appended claims that they shall not be limited to the specific details shown and described in connection with the above explanation.

I claim:

1. A polarizing composite comprising a stretched iodo polyvinyl butyral silicate having at least one surface area capable of polarizing light, and an external transparent protecting surface disposed over said stretched iodo polyvinyl butyral silicate, a coating of polyvinyl butyral disposed on that side of said protecting surface facing inwardly, oxidized castor oil distributed through said coating and through said stretched iodo polyvinyl butyral silicate.

2. A polarizing composite comprising a stretched iodo polyvinyl butyral silicate having surface areas capable of polarizing light, and external transparent protecting surfaces disposed over said stretched iodo polyvinyl butyral silicate, a coating of polyvinyl butyral on the inner faces of said transparent protecting surfaces, oxidized castor oil distributed through said coating and said stretched iodo polyvinyl butyral silicate, the peripheral edge of said external transparent protecting surfaces facing inwardly being bevelled to receive the excess of polyvinyl butyral coating formed in situ.

ALVIN M. MARKS.

REFERENCES CITED

The following references are of record in the file of this patent:

UNITED STATES PATENTS

| Number | Name | Date |
|---|---|---|
| 1,815,884 | Fraser | July 21, 1931 |
| 1,983,875 | Prindle | Dec. 11, 1934 |
| 1,992,249 | Snyder | Feb. 26, 1935 |
| 2,022,479 | Randall | Nov. 26, 1935 |
| 2,110,282 | Amsel | Mar. 8, 1938 |
| 2,176,837 | Ellis | Oct. 17, 1939 |
| 2,219,684 | Fawcett et al. | Oct. 29, 1940 |
| 2,220,111 | Marks | Nov. 5, 1940 |
| 2,232,806 | Ryan | Feb. 25, 1941 |
| 2,233,941 | Fix | Mar. 4, 1941 |
| 2,237,567 | Land | Apr. 8, 1941 |
| 2,263,249 | Rogers | Nov. 18, 1941 |
| 2,256,108 | Blake | Sept. 16, 1941 |
| 2,274,706 | Keim | Mar. 3, 1942 |
| 2,290,180 | Hershberger | July 21, 1942 |
| 2,320,375 | Moulton | Mar. 4, 1943 |
| 2,328,219 | Land | Aug. 31, 1943 |
| 2,336,273 | Malm | Dec. 7, 1943 |
| 2,340,476 | Keim | Feb. 1, 1944 |
| 2,356,250 | Land | Aug. 22, 1944 |
| 2,356,252 | Land | Aug. 22, 1944 |
| 2,360,650 | Crane | Oct. 17, 1944 |

FOREIGN PATENTS

| Number | Country | Date |
|---|---|---|
| 416,412 | Great Britain | Sept. 10, 1934 |
| 474,045 | Great Britain | Oct. 22, 1937 |

OTHER REFERENCES

Strachan Article in Nature, vol. 125, May 3, 1930, page 671, publ. MacMillan, New York.